United States Patent Office 3,485,826
Patented Dec. 23, 1969

3,485,826
3-(2'-R-TETRAHYDROPYRANYL ETHERS) OF ESTRA-1,3,5(10)-TRIENES
Pietro De Ruggieri, Carmelo Gandolfi, and Umberto Guzzi, Milan, Italy, assignors to Ormonoterapia Richter S.p.A., Milan, Italy, an Italian corporation
No Drawing. Filed Dec. 28, 1966, Ser. No. 605,197
Claims priority, application Italy, Oct. 3, 1966, 28,435/66
Int. Cl. C07c 173/00; A61k 27/00
U.S. Cl. 260—239.55           21 Claims

ABSTRACT OF THE DISCLOSURE

3 - (2'-R-tetrahydropyranyloxy)-estra-1,3,5(10)-triene α-anomers in substantially pure form and substantially free from 3-(2'-S-tetrahydropyranyloxy)-estra-1,3,5(10)-triene β-anomers. The α-anomers have a very high hypophysis-inhibiting activity with consequent block of ovulation.

This invention relates to novel compounds of the formula:

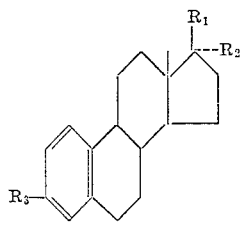

wherein:
$R_1$ is hydroxy, acyloxy, or o-tetrahydropyranyloxy; and wherein the acyl radical in the acyloxy group may be derived from carboxylic acids which are aliphatic, cycloaliphatic, aromatic or araliphatic. Useful aliphatic carboxylic acids include saturated acids having from 1 to 12 carbon atoms. Cyclopentyl- and cyclohexylpropionic acid are illustrative of the cycloaliphatic acids which may be employed. Benzoic acid or an acyl radical derived from a phenyl, p-amino-phenyl or p- or o- hydroxyphenyl nucleus may be employed. Phenylacetic, phenylpropionic, phenylcinnamic or phenylpropiolic acids are illustrative of the araliphatic carboxylic acids employed. Dicarboxylic acids such as succinic and glutaric are within the scope of the disclosure.
$R_2$ is hydrogen, methyl, ethyl, vinyl or ethynyl or $R_1$ and $R_2$ taken together are keto; and
$R_3$ is 2'-tetrahydropyranyloxy of the formula

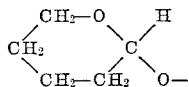

the particular space disposition around the asymmetric C atom of the C—H and C—O-bonds is such that the compounds of this invention of the formula:

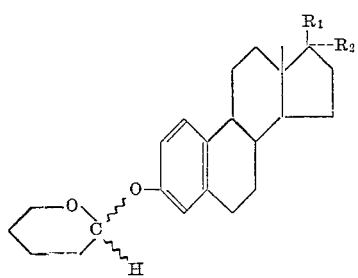

comprise two diastereoisomers. The first diastereoisomer has the more dextrotatory optical power and has, by means of determinations of optical rotary dispersion (ORD), the absolute 2'-R configuration. Since the hemiacetal bond is similar to that of the α-D-glucopyranoside anomer, the first diastereoisomer is here referred to as an α-anomer.

As known from organic chemistry, if a phenol or an alcohol R—OH is reacted with dihydropyran to obtain the corresponding tetrahydropyranyl ether and the starting compound (alcohol or phenol) contains some asymmetric C atoms, the reaction product will be mixture of two tetrahydropyranyl ethers which are not optical antipodes but are diastereoisomers:

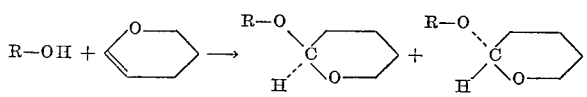

Frequently, in the case of steroids, these diastereoisomers have slightly different melting points and exhibit significant differences in specific rotary power. For each diastereoisomer, one can separate the more dextrorotatory anomer from the less dextrorotatory anomer. Thus, in the case of 3(2-'-tetrahydropyranyl ethers) of estra-1,3,5(10)-trienes, the mixture of the two diastereoisomers has been separated into the two anomer components, the more dextrorotatory one (α-anomer) to which, on the basis of measurements of optical rotary dispersion, the absolute 2'-R configuration has been attributed:

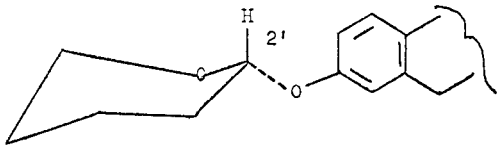

and the less dextrorotatory one (β-anomer), to which necessarily the absolute 2'-S configuration corresponds.

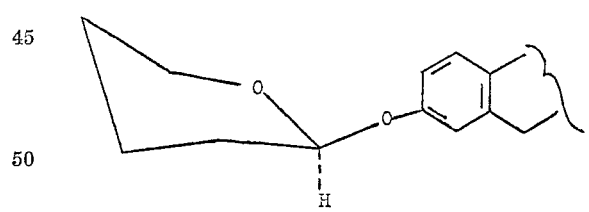

Therefore, the compounds of this invention can be given the following formula:

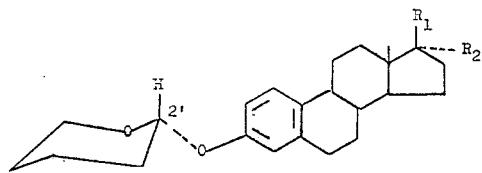

The mixture of the two diastereoisomers (that is, of diastereoisomers 2'-R and 2'-S) is obtained by reacting 3-phenol-steroids with 2,3-dihydropyran in the presence of an acid catalyst.

The α-anomer compounds (2'-R configuration), that is, the more dextrorotatory ones, obtained by separation from the mixture of the two diastereoisomers (mixture of α- and β-anomers) exhibit prominent pharmacological activity which distinguish them from the less dextrorotatory diastereoisomers (β-anomers) which on the basis of the preceding convention, can be represented as follows:

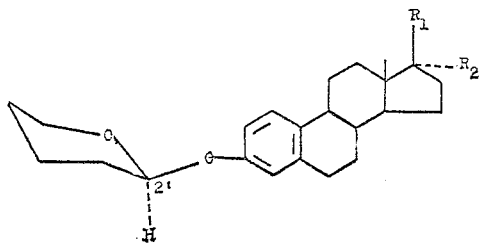

For example, in the case of 3-(2'-tetrahydropyranyloxy)-estra-1,3,5(10)-triene-17β-ol-(estradiol-3-pyranyl) the α-anomer, i.e. 3-(2'-R-tetrahydropyranyloxy)-estra-1,3,5-(10)-triene-17β-ol(estradiol-3α-pyranyl), that is, of the two diastereiosomers, the more dextrorotatory form, having a positive Cotton effect exhibits, when administered by mouth, a moderate estrogenic activity and a very high hypophysis-inhibiting activity with block of ovulation, while the β-anomer, that is, of the two diastereoisomers, the more levorotatory form, having a negative Cotton effect in ORD is scarcely endowed with such an activity.

This difference of pharmacological activity can be related to the different space disposition of the 2'-tetrahydropyranyloxy substituent in relation to the plane of the steroid molecule, and therefore, it may be favourable or may inhibit the linking of the new steroid molecule to the enzymic system which is responsible for biological activity.

Therefore, the separation of the mixture of the two diastereosiomers of tetrahydropyranyl ethers of estrogenic steroids into the two α- and β-anomer components assumes particular importance since only the α-anomer (that is, the pure diastereoisomer form having a higher dextrorotatory power) exhibits very high anti-fecundating activity.

The preparation can take place by separating the mixture of the α- and β- anomers by means of physical methods (fractionated crystallization, gas chromatography, column chromatography, preparative chromatography on a thin layer) or by starting from the α-anomer, as obtained by separation from the β-anomer, and subjecting this α-anomer to successive reactions. Thus, for example, by reducing estrone-3-(2'-R-tetrahydropyranyloxy) (that is, of the two diastereoisomers, the more dextrorotatory form (2'-R-), with NaBH₄ or with LiAlH₄ or with an alcohol and Na estradiol-3(2'-R-tetrahydropyranyloxy) is obtained and this compound may be oxidized to obtain estrone-3(2'-R-tetrahydropyranyloxy) Thus by ethynylation of estron-3(2'-R-tetrahydropyranyloxy), 17α-ethynyl-estradiol-3(2'-R-tetrahydropyranyloxy) is obtained, and from the latter, by partial or total reduction, 17α-vinyl- and 17α-ethyl-estradiol-3-(2'-R-tetrahydropyranyloxy).

In an analogous manner, estradio 3-(2'-R-tetrahydropyranyloxy) (that is, the more dextrorotatory form of the 2 diastereoisomers, having a positive Cotton effect), may be reacted with acid anhydrides or acid chlorides to obtain estradiol 3-(2'-R-tetrahydropyranyl ether)-17β-acyloxy compounds. However, reaction with 2,3-dihydropyran results in the mixture of the two 17β-diastereoisomers of estradiol-bis [3(2'-R-), 17β(2''R and 2''S)-tetrahydropyranyl ether], which can be separated to give estra 1, 3, 5(10)-triene-3-(2'-R-tetrahydropyranyloxy)-17β-(2''R-tetrahydropyranyloxy) I and estra-1,3,5(10)-triene-3(2'-R-tetrahydropyranyloxy)-17β - (2''-S-tetrahydropyranyloxy) II:

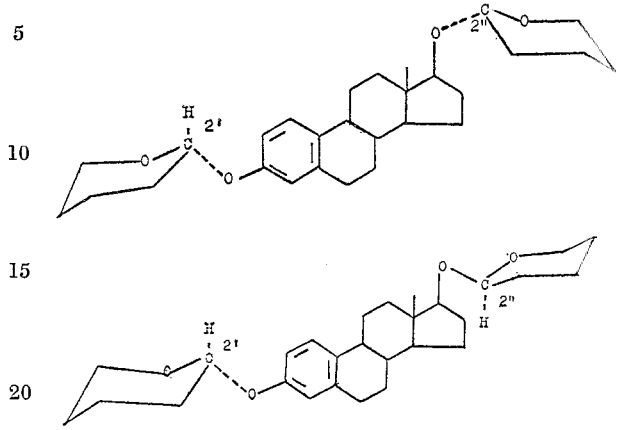

The following examples are only illustrative and are in no way constructed to limit the invention.

EXAMPLE 1

2-(2'-R-tetrahydropyranyloxy)-estra-1,3,5(10)-triene-17-one 3 parts phosphorus oxychloride is dropped into a suspension of 100 parts estra-1,3,5(10)-triene-3-ol-17-one in 400 parts of 2,3-dihydropyran, under stirring and while cooling externally by an ice-water bath. After 15 minutes, the mixture is cautiously warmed on a water bath up to complete dissolution of the steroid; the reaction mixture is then maintained at room temperature for 18 hours. It is neutralized by adding a sodium methylate solution in methanol, it is diluted with 2500 parts methylene chloride, washed with water and dried over sodium sulfate and evaporated to dryness.

By crystallization from methylene chloride-hexane there is obtained 125 parts 3-(2'-tetrahydropyranyloxy)-estra-1,3,5(10)-triene-17-one, a mixture of the two anomers M.P. 136–139° C.; $[\alpha]_D = +120°$ (c.=1% in $CHCl_3$).

By evaporation to dryness of the acetone mother liquors from two successive crystallizations from acetone, there is obtained 34 parts crude 3-(2'-tetrahydropyranyloxy) estra-1,3,5(10)-triene-17-one; $[\alpha]_D = +183°$ (c.=1% in $CHCl_3$).

These 34 parts are dissolved in 500 parts ethyl ether and after concentration of the solution to 400 parts, the supernatant solution over the precipitate, upon concentration to 200 parts yields a crude 3-(2'-R-tetrahydropyranyloxy)-estra-1,3,5(10)-triene-17-one; $[\alpha]_D = +195°$ (c.=1% in $CHCl_3$) from which, by crystallization from methanol there is obtained 11.8 parts 3-(2'-α-tetrahydropyranyloxy)-estra-1,3,5(10)-triene-17-one, M.P. 147.5–149° C.; $[\alpha]_D = +22°$ (c.=1% in $CHCl_3$).

EXAMPLE 2

3-(2'-R-tetrahydropyranyloxy)-estra-1,3,5(10)-triene-17β-ol 2 parts phosphorus oxychloride is added to a suspension of 100 parts estra-1,3,5(10)-triene-3-ol-17-one in 400 parts 2,3-dihydropyran, under stirring. The mixture is warmed up to complete dissolution of the material and is held then at 20° C. for one night. After neutralization of the reaction mixture with a sodium methylate solution in methanol, it is diluted with 2500 parts methylene chloride, washed with water to neutrality, dried over $Na_2SO_4$ and evaporated to dryness. The product obtained is washed hot with hexane to yield 122 parts 3-(2'-tetrahydropyranyloxy)-estra-1,3,5(10)-triene-17-one, a mixture of the two anomers. This crude product, without further purification, is dissolved in 180 parts methanol and 360 parts dioxane and 30 parts sodium borohydride are added to it, and the solution is refluxed for 3 hours. Then, it is concentrated under vacuum to half its volume and it is diluted with water while continuing to remove the solvent. By diluting with a total of 500 parts water, after filtration, there is obtained 120 parts 3-(2'-tetrahydropyranyloxy) - estra - 1,3,5(10)-triene-17β-ol; $[\alpha]_D=+65°$; (c.=1% in $CHCl_3$) a mixture of the α- and β-anomers.

The product, a mixture of the two diastereoisomers, is dissolved in 4000 parts ethyl ether and is thereafter concentrated to 3400, 2000, 1000 parts of solution. The crystallization solids are every time discarded. The final solution (1000 parts) is concentrated successively to 700, 600, and 500 parts of solution and the collected solids yield 35 parts crude 3-(2'-tetrahydropyranyloxy)estra-1,3,5(10)-triene-17β-ol; $[\alpha]_D=+122°$ (c.=1% in $CHCl_3$).

This crude product is successively crystallized from ethyl ether and methanol to yield 26 parts 3-(2'-R-tetrahydropyranyloxy) - estra - 1,3,5(10)-triene-17β-ol, M.P. 126–129° C.; $[\alpha]_D=+150°$ (c.=1% in $CHCl_3$). Cotton effect, positive in O.R.D.

EXAMPLE 3

3-,2'-R-tetrahydropyranyloxy)-estra-1,3,5(10)-17β-ol 3.6 parts 3 - (2' - R - tetrahydropyranyloxy) - estra - 1,3,5(10)-triene-17-one (M.P. 147.5–149° C.; $[\alpha]_D=+220°$ in $CHCl_3$) is dissolved in 18 parts dry tetrahydropyran and 0.72 part $LiAlH_4$ are added, and the mixture is refluxed for one hour. The excess $LiAlH_4$ is destroyed with 1.5 parts ethyl acetate, and the mixture is then filtered and highly diluted with water. The crude product is collected by filtration and is crystallized from ethyl ether to yield 2.9 parts 3-(2'-R-tetrahydropyranyloxy)-estra-1,3,5(10)-triene-17β-ol, M.P. 127.5–129° C.; $[\alpha]_D=+150°$ (c.=1% in $CHCl_3$).

EXAMPLE 4

3-(2'-R-tetrahydropyranyloxy)-estra-1,3,5(10)-triene-17-one

A solution of 1 part 3-(2'-R-tetrahydropyranyloxy)-estra - 1,3,5(10) - triene - 17β - ol (M.P. 127.5–129° C.; $[\alpha]_D=+150°$ (c.=1% in $CHCl_3$) is added to a suspension of 1 part chromic anhydride in 10 parts pyridine. The resulting solution is maintained overnight at room temperature, then it is highly diluted with water and filtered. The crude product, as collected on the filter, is crystallized from ethyl ether to yield 0.82 parts 3-(2'-α-tetrahydropyranyloxy)-estra-1,3,5(10)-triene-17-one; $[\alpha]_D=+220°$ (c.=1% in $CHCl_3$).

EXAMPLE 5

3-(2'-R-tetrahydropyranyloxy)-estra-1,3,5(10)-triene-17β-ol-17-acetate 3 parts 3 - (2' - R - tetrahydropyranyloxy) - estra - 1,3,5(10)-triene-17β-ol is dissolved in 10 parts pyridine and 5 parts acetic anhydride are added. After one night at room temperature, the mixture is diluted with water and filtered. The crude product is collected by filtration and then it is crystallized from methanol to yield 2.97 parts 3 - (2' - R - tetrahydropyranyloxy) - estra - 1,3,5(10)-triene-17β-ol-17-acetate M.P. 132–134° C.; $[\alpha]_D=+122°$ (C.=1% in $CHCl_3$).

EXAMPLE 6

By starting from 2 parts 3(2'-R-tetrahydropyranyloxy)-estra-1,3,5(10)-triene-17β-ol and by operating as in Example 5 but with propionic anhydride, there was obtained 2 parts 3-(2'-α-tetrahydropyranyloxy)-estra-1,3,5(10)-triene-17β-ol-17-propionate M.P. 111–112° C.; $[\alpha]_D=+114°$ (c.=1% in $CHCl_3$).

EXAMPLE 7

By starting from 2 parts 3(2'-R-tetrahydropyranyloxy)-estra-1,3,5(10)-triene-17β-ol and by operating as in Example 5, but with valeric anhydride, after steam distillation of the reaction mixture, extraction with ether and percolation through an alumina column (95:5 hexane-ether as the eluent), there is obtained 1.80 parts 3-(2'-R - tetrahydropyranyloxy) - estra - 1,3,5(10) - triene-17β-ol-17-valerate, an oily product, $[\alpha]_D=+112°$ (c.= 1% in $CHCl_3$).

EXAMPLE 8

By operating as in Example 7, but with enantic anhydride, there is obtained 1.65 g. 3-(2'-R-tetrahydropyranyloxy)-estra-1,3,5(10)-triene-17β-ol-17-enantate, an oily product, $[\alpha]_D=+104°$ (c.=1% in $CHCl_3$).

EXAMPLE 9

By operating as in Example 5, but with cyclopentylpropionic acid chloride, from 0.5 part 3-(2'-R-tetrahydropyranyloxy)-estra-1,3,5(10)-triene-17β-ol there is obtained 0.38 part 3-(2'-R-tertahydropyranyloxy)-estra-1,3,5(10)-triene-17β-ol-17-cyclo-pentylpropionate, $[\alpha]_D=+108°$ (c.=1% in $CHCl_3$).

EXAMPLE 10

3-(2'-R-tetrahydropyranyloxy)-17α-methyl-estra-1,3,5(10)-triene-17β-ol

A solution of 2.2 parts d,1-2-chlorotetrahydropyran in 15 parts benzene is dropped, under stirring into a suspension of 5.4 parts sodium derivative of 17α-methyl-estra-1,3,5(10)-triene-3,17β-diol in dry benzene. The mixture is kept under stirring for 4 hours, filtered, and the benzene solution, after repeated washing with alkali, is washed with water up to neutrality and evaporated to dryness to yield a residue of 2.4 parts 3-(2'-tetrahydropyranyloxy) - 17α - methyl - estra - 1,3,5(10) - triene-17β-ol (mixture of the two anomers); $[\alpha]_D=+46°$ (c.=1% in $CHCl_3$). By chromatography through alumina inactivated with 5% water, from the petroleum ether:benzene (4:3) eluates there is isolated 0.45 part pure 3-(2'-R - tetrahydropyranyloxy) - 17α - methyl - estra - 1,3,5(10)-triene-17β-ol; $[\alpha]_D=+133°$ (c.=1% in $CHCl_3$). Cotton effect, positive in O.R.D.

EXAMPLE 11

3-(2'-R-tetrahydropyranyloxy)-17α-ethynyl-estra-1,3,5(10)-triene-17β-ol

A solution of 2 parts 3-(2'-R-tetrahydropyranyloxy)-estra-1,3,5(10)-triene-17-one in a mixture of 17 parts toluene and 135 parts dry ethyl ether is deaerated by passing a nitrogen current through it for 30 minutes at the temperature of 0° C. The solution is thereafter saturated with acetylene. In a period of 15 minutes, 30 parts of a 30% potassium tert-butylate solution in tert-butanol is added, and acetylene is bubbled for 8 hours through the mixture, which is then stored for 5 days in ice at −5° C. The precipitate which is formed, is collected by filtration, washed with 10 parts anhydrous ether, dried under vacuum, treated with an aqueous 12% $NH_4Cl$ solution, collected again by filtration, washed with water to neutrality and lastly re-crystallized from ethyl ether in hexane to yield 1.75 parts 3 - (2' - R-tetrahydropyranyloxy)-17α-ethynyl-estra-1,3,5(10)-triene-17β - oil, M.P. 79–81° C.; $[\alpha]_D=+89°$ (c.=1% in $CHCl_3$).

EXAMPLE 12

3-(2'-R-tetrahydropyranyloxy)-17α-vinyl-estra-1,3,5(10)-triene-17β-ol 1.25 parts 3-(2'-R-tetrahydropyranyloxy)-17α-ethynyl-estra-1,3,5(10)-triene-17β-ol (see Example 12) is dissolved in 8.5 parts pyridine and 7.5 parts dioxane; 1.2 parts palladium on calcium carbonate is added and hydrogenation is carried out under a pressure of 760 mm. Hg. When the equivalent of 1 mole hydrogen has been absorbed, the catalyst is filtered off, and the solution is evaporated to dryness. The crystallezation from aqueous methanol yields 1.08 parts 3-(2'-R-tetrahydropyranyloxy)-17α-vinyl-estra-1,3,5(10)-triene - 17β - ol; $[\alpha]_D = +132°$ (c.=1% in CHCl$_3$).

EXAMPLE 13

3-(2'-R-tetrahydropyranyloxy)-17α-ethyl-estra-1,3,5(10)-triene-17β-ol 2 parts 3 - (2' - R-tetrahydropyranyloxy)-17α-ethynyl-estra-1,3,5(10)-triene-17β-ol is dissolved in 20 parts ethanol and hydrogenated in the presence of 2 parts Pd on 5% calcium carbonate. The catalyst is filtered off, the solution is concentrated to a small volume and diluted with water. There is obtained 1.85 parts 3-(2'-R-tetrahydropyranyloxy)-estra-1,3,5(10)-triene-17β - ol, M.P. 72–74° C.; $[\alpha]_D = +128°$ (c.=1% in CHCl$_3$). Cotton effect, positive in O.R.D.

EXAMPLE 14

17α-methyl-estra-1,3,5(10)-triene-bis-[3-(2'-R), 17β-(2''-R and S)-tetrahydropyranyloxy]

1 part 2,3-dihydropyran is added to a solution of 3.4 parts 3 - (2' - R-tetrahydropyranyloxy)-17α-methyl-estra-1,3,5(10)-triene-17β-ol in dry benzene (see Example 10); then a solution of 0.12 part p-toluene sulfonic acid in 10 parts benzene is added. The mixture is held for 6 hours at room temperature, then it is neutralized with a sodium methylate solution in methanol, washed with water to neutrality and evaporated to dryness. By crystallization from ethyl ether-hexane there is obtained 3.82 parts 17α-methyl-estra-1,3,5(10)-triene-bis-[3,(2'-R), 17β - (2'' - R and S)-tetrahydropyranyloxy], M.P. 111–114° C.; $[\alpha]_D = +110°$ (c.=1% in CHCl$_3$).

EXAMPLE 15

17α-ethynyl-estra-1,3,5(10)-triene-bis[3-(2'-R)-17β-(2''-R and S)-tetrahydropyranyloxy]

By operating at 0° C., 2 parts 3-(2'-R-tetrahydropyranyloxy)-17α-ethynyl-estra-1,3,5(10)triene-17β - ol is dissolved in 10 parts 2,3-dihydropyran, and 0.025 part phosphorus oxychloride is added to the solution.

This is left for 12 hours at room temperature, then it is diluted with 120 parts ether and the organic phase is washed with a 5% NaHCO$_3$ solution and with water.

The solution is evaporated to dryness and the residue is crystallized from petroleum ether to yield 1.81 parts 17α-ethynyl-estra-1,3,5(10)-triene - bis - [3,(2' - R), 17β-(2''-R and S)-tetrahydropyranyloxy], M.P. 126–131° C.; $[\alpha]_D = +44°$ (c.=1% in CHCl$_3$). The mother liquors, by cautious evaporation and successive crystallization from ethyl ether allow the separation of 0.15 part of a product $[\alpha]_D = +87°$ (c.=1% in CHCl$_3$) which is supposed to be impure 17α-ethynyl-estra-1,3,5(10)-triene-bis-[3-(2'-R), 17β-(2''-S)-tetrahydropyranyloxy].

EXAMPLE 16

Estra-1,3,5(10)-triene-bis-[3-(2'-R),17β-(2'')-tetrahydropyranyloxy]

A solution of 0.01 part p-toluene sulfonic acid in 5 parts benzene and 0.4 part 2,3-dihydropyran are added to a solution of 1 part 3-(2'-α-tetrahydropyranyloxy)-estra-1,3,5(10)-triene-17β-ol in 10 parts benzene while cooling to about 5° C. The mixture is held for 4 hours at 5° C., neutralized with sodium methylate, washed with water to neutrality and evaporated to dryness, to yield, after crystallization from petroleum ether, 0.98 part estra-1,3,5(10)-triene-bis-[3-(2'-R),17β - (2'') - tetrahydropyranyloxy], M.P. 94–96° C.; $[\alpha]_D = +115°$ (c.=1% in CHCl$_3$).

EXAMPLE 17

Estra-1,3,5(10)-triene-bis-[3-(2'-R),17β-(2'-R)-tetrahydropyranyloxy] and estra-1,3,5(10)-triene-bis-[3-(2'-R),17β(2''-S)-tetrahydropyranyloxy]

10 parts estra-1,3,5(10)-triene-bis-[3-(2'-R),17β-(2'')-tetrahydropyranyloxy] (see Example 16) is allowed to be adsorbed by a column of 400 g. activated alumina II according to Brackmann, and is eluted with a mixture of petroleum ether-ethyl ether 80:20. The eluates are collected as 100 ml. portions, and the rotatory power of the residue, collected after evaporation, is determined. The fractions from $[\alpha]_D = +145°$ to $[\alpha]_D = +130°$ (c.=1% in CHCl$_3$) are collected and united, and repeatedly recrystallized from hexane and ethyl ether to yield 0.45 part estra - 1,3,5(10) - triene-bis-[3-(2'-R),17β-(2''-R)-tetrahydropyranyloxy]. M.P. 115–117° C.; $[\alpha]_D = +168°$ (c.=1% CHCl$_3$). Thereafter, the eluates with $$[\alpha]_D = +100°$$

and $[\alpha]_D = +95°$ are collected, and by crystallization from acetone there was obtained 1.2 parts estra-1,3,5(10)-triene-bis-[3-(2'-R),17β-(2''-S) - tetrahydropyranyloxy], M.P. 90–91° C.; $[\alpha]_D = +83°$ (c.=1% in CHCl$_3$).

We claim:

1. 3-(2'-R-tetrahydropyranyloxy) - estra - 1,3,5(10)-triene α-anomer substituted at the 17 carbon atom by the grouping

wherein R$_1$ is hydroxy, acyloxy or tetrahydropyranyloxy and R$_2$ is hydrogen, methyl, ethyl, vinyl or ethynyl or wherein R$_1$ and R$_2$ together are keto, the acyl radical of said acyloxy group being derived from a saturated aliphatic carboxylic acid of 1 to 8 carbon atoms, cyclopentylpropionic acid, cyclohexylpropionic acid, benzoic acid, phenylacetic acid, phenylpropionic acid, phenylcinnamic acid or phenylpropiolic acid, said α-anomer in substantially pure form and being substantially free from the corresponding 3 - (2'-S-tetrahydropyranyloxy)-estra-1,3,5(10)-triene β-anomer.

2. The compound of claim 1 wherein the α-anomer is 3-(2'-R-tetrahydropyranyloxy) - estra - 1,3,5(10)-triene-17-one.

3. The compound of claim 1 wherein the α-anomer is 3-(2'-R-tetrahydropyranyloxy) - estra - 1,3,5(10)-triene-17β-ol.

4. The compound of claim 1 wherein the α-anomer is 3-(2'-R-tetrahydropyranyloxy) - estra - 1,3,5(10) - triene-17β-ol-17-acetate.

5. The compound of claim 1 wherein the α-anomer is 3-(2'-R-tetrahydropyranyloxy) - estra - 1,3,5(10)-triene-17β-ol-17-propionate.

6. The compound of claim 1 wherein the α-anomer is 3 - (2' - R - tetrahydropyranyloxy)-estra-1,3,5(10)-triene-17β-ol-17-valerate.

7. The compound of claim 1 wherein the α-anomer is 3 - (2' - R - tetrahydropyranyloxy)-estra-1,3,5(10)-triene-17β-ol-17-enanthate.

8. The compound of claim 1 wherein the α-anomer is 3 - (2' - R - tetrahydropyranyloxy)-estra-1,3,5(10)-triene-17β-ol-17-cyclopentylpropionate.

9. The compound of claim 1 wherein the α-anomer is 3 - (2' - R - tetrahydropyranyloxy)-estra-1,3,5(10)-triene-17β-ol-17-benzoate.

10. The compound of claim 1 wherein the α-anomer is 3 - (2' - R - tetrahydropyranyloxy)-estra-1,3,5(10)-triene-17β-ol-17-phenylpropionate.

11. The compound of claim 1 wherein the α-anomer is 3-(2'-R-tetrahydropyranyloxy) - 17α - methyl-estra-1,3,5(10)-triene-17β-ol.

12. The compound of claim 1 wherein the α-anomer is 3-(2' - R - tetrahydropyranyloxy)-17α-ethynyl-estra-1,3,5 (10)-triene-17β-ol.

13. The compound of claim 1 wherein the α-anomer is 3-(2' - R - tetrahydropyranyloxy) - 17α - vinyl-estra-1,3,5 (10)-triene-17β-ol.

14. The compound of claim 1 wherein the α-anomer is 3-(2' - R - tetrahydropyranyloxy) - 17α - ethyl-estra-1,3,5 (10)-triene-17β-ol.

15. The compound of claim 1 wherein the α-anomer is 17α - methyl-estra-1,3,5(10)-triene-bis-[3-(2'-R),17β-(2''-R)-tetrahydropyranyloxy].

16. The compound of claim 1 wherein the α-anomer is 17α - methyl-estra-1,3,5(10)-triene-bis-[3-(2'-R),17β-(2''-S)-tetrahydropyranyloxy].

17. The compound of claim 1 wherein the α-anomer is 17α - ethynyl-estra - 1,3,5(10)-triene-bis-[3 - (2'-R),17β-(2''-R)-tetrahydropyranyloxy].

18. The compound of claim 1 wherein the α-anomer is 17α - ethynyl-estra - 1,3,5(10)-triene-bis-[3-(2'-R),17β-(2''-S)-tetrahydropyranyloxy].

19. The compound of claim 1 wherein the α-anomer is estra-1,3,5(10)-triene-bis-[3(2'-R),17β-(2''-tetrahydropyranyloxy)].

20. The compound of claim 1 wherein the α-anomer is estra-1,3,5(10)-triene-bis-[ 3- (2'-R),17β-(2''-R)-tetrahydropyranyloxy].

21. The compound of claim 1 wherein the α-anomer is estra - 1,3,5(10)-triene-bis-[3-(2'-R),17β-(2''-S)-tetrahydropyranyloxy].

References Cited

UNITED STATES PATENTS 3,134,771   5/1964   De Ruggieri et al. __ 260—239.55

OTHER REFERENCES

Gandolfi et al. Gazetta Chimica Italiana, v. 94, June, 1964, pp. 675–94, pp. 681 and 690 relied upon.

De Ruggieri et al. J.A.C.S. 81, November, 1959, pp. 5725–5727, p. 5725 relied upon.

ELBERT L. ROBERTS, Primary Examiner

U.S. Cl. X.R.

260—999